F. H. SCHULTZ.
ANIMAL OILING DEVICE.
APPLICATION FILED FEB. 7, 1917.
1,276,972.
Patented Aug. 27, 1918.
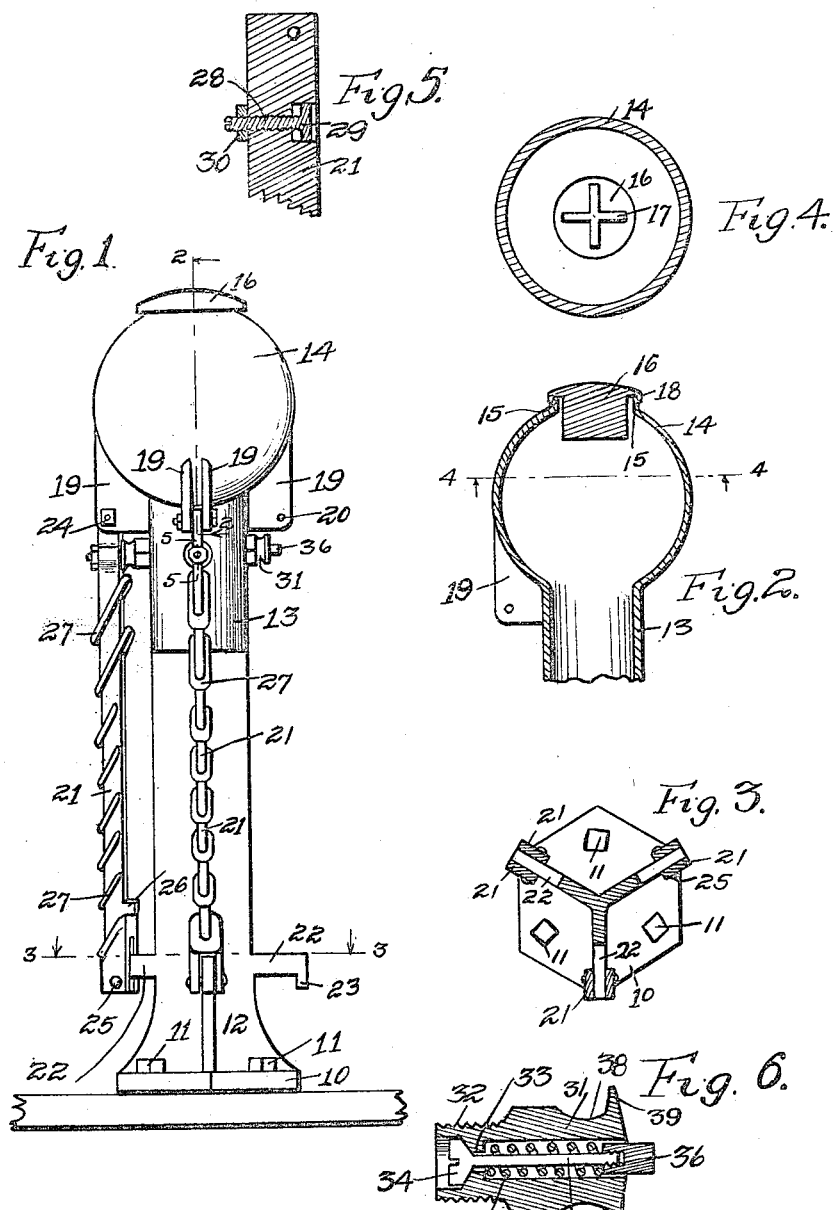
Witness
Will Freeman
Inventor
Ferdinand H. Schultz
by Orwig & Bair Attorneys

UNITED STATES PATENT OFFICE.

FERDINAND H. SCHULTZ, OF TREYNOR, IOWA.

ANIMAL-OILING DEVICE.

1,276,972.   Specification of Letters Patent.   Patented Aug. 27, 1918.

Application filed February 7, 1917. Serial No. 147,236.

*To all whom it may concern:*

Be it known that I, FERDINAND H. SCHULTZ, a citizen of the United States, residing at Treynor, in the county of Pottawattamie and State of Iowa, have invented a certain new and useful Animal-Oiling Device, of which the following is a specification.

The object of my invention is to provide a device of this kind of simple, durable, and inexpensive construction.

A further object of my invention is to provide a post designed to be bolted on a portable platform, and provided with a receptacle for oil or other liquid insecticide or disinfectant and also provided with valves through which quantities of said liquids may be removed.

A further object is to provide means whereby the valves are opened to permit discharge of liquid from the receptacle by the animal rubbing against a suitable roughened surface provided on the post for that purpose.

A further object is to provide means for conveying the liquid from the valve to the skin of the animal.

A further object of my invention is to provide a device of such construction that animals cannot injure themselves on projecting parts.

A further object is to provide valves of such construction that the liquid will pass through them freely but will not spurt from the outlets, and being so shaped that the insecticide will drop vertically from the discharge and on to the actuating arms, instead of having a tendency to run along the lower side of the valve casing back to the post proper.

My invention consists in the arrangement, construction and combination of the various parts of the device, whereby the objects contemplated are attained, as hereinafter more fully set forth, pointed out in my claims, and illustrated in the accompanying drawings, in which:

Figure 1 shows a side elevation of an animal oiling device embodying my invention, one of the actuating arms being removed.

Fig. 2 shows a vertical, sectional view taken on the line 2—2 of Fig. 1.

Fig. 3 shows a horizontal, sectional view taken on the line 3—3 of Fig. 1.

Fig. 4 shows a horizontal, sectional view taken on the line 4—4 of Fig. 2.

Fig. 5 shows an enlarged vertical, sectional view taken on the line 5—5 of Fig. 1, and Fig. 6 shows an enlarged vertical central sectional view of the valve.

Referring to the accompanying drawings, I have used the reference numeral 10 to indicate generally a base adapted to be fastened to a concrete foundation or the like by lag screws 11.

Formed integral with and extending upwardly from the base 10 is an upright portion 12 composed of radially extending flanges preferably three in number. Extending upwardly from the upper extremity of the upright is a hollow cylinder 13 closed at its lower end and formed integral with the upper end of said upright. The cylinder 13 is of such diameter that its outside edges coincide with the outside edges of the flanges of the upright 12.

At intervals in the circumference of the cylinder 13, screw threaded openings are made, each of said openings being in vertical alinement with the outside edges of the flanges of the upright 12 and in horizontal alinement with each other, also being in a plane spaced apart from the top and bottom of the cylinder.

A hollow sphere 14 is formed integral with and above the cylinder 13 and is provided with an opening into the inside of the cylinder. The top of the sphere has an opening therein and an upwardly extending annular flange 15 is formed around same. A cap 16 is adapted to fit in the last described opening which is constructed as follows. The main portion extends beyond the flange 15 and has a downwardly extending annular flange 18, the inside surface of the latter flange being adapted to coact with the outside surface of the flange 15 to prevent displacement of the cap and to prevent rain water from seeping into the sphere. The cap is also provided with a downwardly extending portion preferably the shape of a cross in cross section, its diameter at the point of greatest width being slightly less than that of the opening in the top of the sphere. The portion 17 extends into the sphere a sufficient distance so that the cap 16 must be lifted almost vertically for some distance before the lower end of the portion 17 clears the flange 15.

Pairs of parallel depending lugs 19 extend downwardly and outwardly from the lower outside surface of the sphere 14 to a point in vertical alinement with the outside surface of the sphere at its greatest width and in horizontal alinement with a point slightly spaced down from the bottom of the sphere. The lugs 19 of each pair are spaced apart from each other a distance substantially equal to the thickness of the flanges of the upright 12 and are placed so that the space between each such pair is in vertical alinement with the outside edge of one such flange. Registering openings are made in each pair of lugs 19 near their lower outside corners.

The flanges of the upright 12 are each provided with an outwardly projecting lug 22 which is spaced up from the base 10. The lugs 22 extend outwardly to a point in vertical alinement with the outside edge of the lugs 19 and are provided with downwardly projecting stops 23 at their outer extremities.

Each arm 21 is detachably pivoted at its upper end between one of the pairs of lugs 19 by passing a bolt 24 through openings 20 and an appropriate opening in the arm. The lower end of each arm 21 is bifurcated to receive between the divided parts a lug 22, and a pin 25 is passed through such parts below such lug which is adapted to engage the stop 23 to limit the outward movement of the lower end of the arm. Each arm 21 is provided with a lug 26 extending inwardly from the inner edge of the arm to coact with the outside edge of the flange on the upright 12 to limit the inward movement of the lower end of the arm. Downwardly and outwardly extending flanges 27 are formed at intervals along the arms to conduct any liquid on the surface of the arm toward its outer edge.

An internally screw threaded opening 28 extends through each arm, said openings being of smaller size than the previously described openings in the circumference of the cylinder 13 and so placed that the axes of both openings are lined. The inner ends of the openings 28 are larger than the balance of the openings so that the head of a bolt 29 may be countersunk therein for some distance when the said bolt is screwed into the opening 28. A lock nut 30 is screwed onto the end of the bolt 29 so that when it is screwed to bring the head to a predetermined distance in from the surface of the arm, said bolt can be locked in position. The bolt is split at its outer end to receive a screw driver so that it may be adjusted from the outside.

A spring closing valve is screwed into each of the lateral openings in the cylinder 13 and adapted to be opened by the movement of arms 21. Each such valve consists of the casing which is screw threaded at 32 to coact with said openings and provided with a central longitudinal opening. The inner end of said opening is enlarged to accommodate within it a valve, and an annular inwardly extending flange 33 is formed between said enlarged portion and the balance of the opening. The flange 33 has its inner sides inclined to form a valve seat. The valve consists of a valve head 34 which is notched to receive a screw driver and a closure portion which is inclined to correspond to the slant of the valve seat. Formed integral with the head 34 and extending through the valve portion is a stem 35 terminating in an externally screw-threaded portion just inside the outer end of the casing 31. A plug 36 has a screw-threaded opening in one end adapted to receive the end of the stem 35 and is of such size that its other end will project a short distance from the end of the casing 31. A coil spring 37 encircles the stem 35 and engages the flange 33 and plug 36 to hold them yieldingly separated. The plug 36 and stem 35 are both sufficiently smaller than the openings in which they are mounted to permit a free passage of liquid around them. The outer end of the plug 36 is further adapted to rest against the inner surface of the head of the bolt 29. The valve casing 31 is formed with a deep, annular groove 38 in its outside surface near the discharge end, so that an annular bead 38 is formed adjacent to said end.

In the practical operation of my device, I fill the sphere 14 and cylinder 13 with any liquid which it is desired to apply to the skin of the animals, the valve head 34 having been previously turned to screw the stem 35 into the plug 36 to put the spring 37 under sufficient compression to hold the head into the valve seat very tightly. This will cause the plug 36 to be held yieldingly in place so that any pressure against it will open the valve, but there will be a tendency to return to place when the pressure is lightened.

The bolt 29 is then adjusted so that when the arm 21 is at the outer limit of its movement the valve 34 will be closed but the inward movement of the arm will open it. The lock nut 30 is then screwed into place to prevent the bolt 29 from changing position. It will be seen that the pressure of the spring 37 will always return the arms to the outer limit of their movement when any inward pressure against them is removed.

Then animals which are affected with any itch will rub the itching place against the arms 21 and push them inwardly thereby opening valves 34 and permitting the liquid to flow out around the plug 36, thence down to the front of the arms 21, where it will be rubbed off by the animal.

It will be noted that the cap 16 affords a large opening into the tank for filling yet may be merely set in place without any fastening means and it is almost impossible to knock or push it off on account of the downwardly extending portion 17. This construction also allows the upper surface to be constructed without projecting parts on which animals can injure themselves.

The valves 34 with their seats 33 provide a means for preventing sudden spurts of liquid which would allow any oil to waste by dropping off instead of running down the arm 21, and the bead 39 with the groove 38 makes it impossible for the insecticide to run by capillary attraction back along the casing and down the post 13. Further the arms are provided with the wear-take screws 29 which allow external adjustment of the parts, so that the device need not be taken apart to make most of the few adjustments necessary.

The arms are supported by the lugs 19 and 22 which are formed integral with the supports so there are no projections on which an animal may rub which can cause an abrasion or bruise. In this connection I call attention to the fact that if there are any such projections, a pregnant sow is liable to get caught over them and injure herself or the young.

The construction shown wherein the valves take the liquid from the oil chamber some distance from the bottom makes it almost impossible for sediment to be washed into the valves to clog them.

A further advantage is claimed in the lugs 26 which limit the inward movement of the arms 21 by engaging the upright 12, in that the use of a lug formed integral with the arm makes a positive stop which is not liable to breakage, and does not require adjustment after once being cut off to the proper distance. It will also be noted that the greatest strain on the post is when the animals rub against the arms so that a positive simple stop is essential to limit the inward movement of the arms.

Some changes may be made in the arrangement and construction of the parts of my improved animal oiling device and it is my intention to cover by my present application any such changes in the construction and arrangement which may be included within the reasonable scope of my claims.

I claim as my invention:

1. In an animal oiler, an upright, a container at the upper end thereof, a pivoted arm arranged alongside said container, said arm having an opening extending through it, said receptacle having an opening through its wall, and means for conducting liquid from said receptacle to said arm including a bolt adjustably mounted in said arm having a head countersunk in the opening in said arm on the side adjacent to said receptacle below the outer surface of the arm, a valve casing mounted in the opening in said receptacle having a head on its outer end with an annular lower edge, a valve in said casing having a stem projecting through said head and adapted to enter the opening in the arm and to contact with the bolt head therein in one position of the arm, and means for yieldingly holding said valve in seated position.

2. In an animal oiler, an upright, a receptacle at the upper end thereof, a movable arm adjacent to said upright and extending alongside said receptacle, said arm having an opening therein, a valve casing mounted in the wall of said receptacle, a valve in said casing having a stem projecting from the casing and adapted to enter the opening in said arm and engage a member on said arm in said opening for actuating said valve, whereby the point of discharge from the valve casing may be against said arm.

3. In an animal oiler, an upright, a receptacle at the upper end thereof, a movable arm adjacent to said upright and extending alongside said receptacle, said arm having an opening therein, a valve casing mounted in the wall of said receptacle, a valve in said casing having a stem projecting from the casing and adapted to enter the opening in said arm and engage a member on said arm in said opening for actuating said valve, whereby the point of discharge from the valve casing may be against said arm, said casing having a head with an upright narrow lower edge.

Des Moines, Iowa, September 8, 1916.

FERDINAND H. SCHULTZ.